BINARY TO DECIMAL RADIX CONVERSION APPARATUS

Filed Feb. 4, 1957

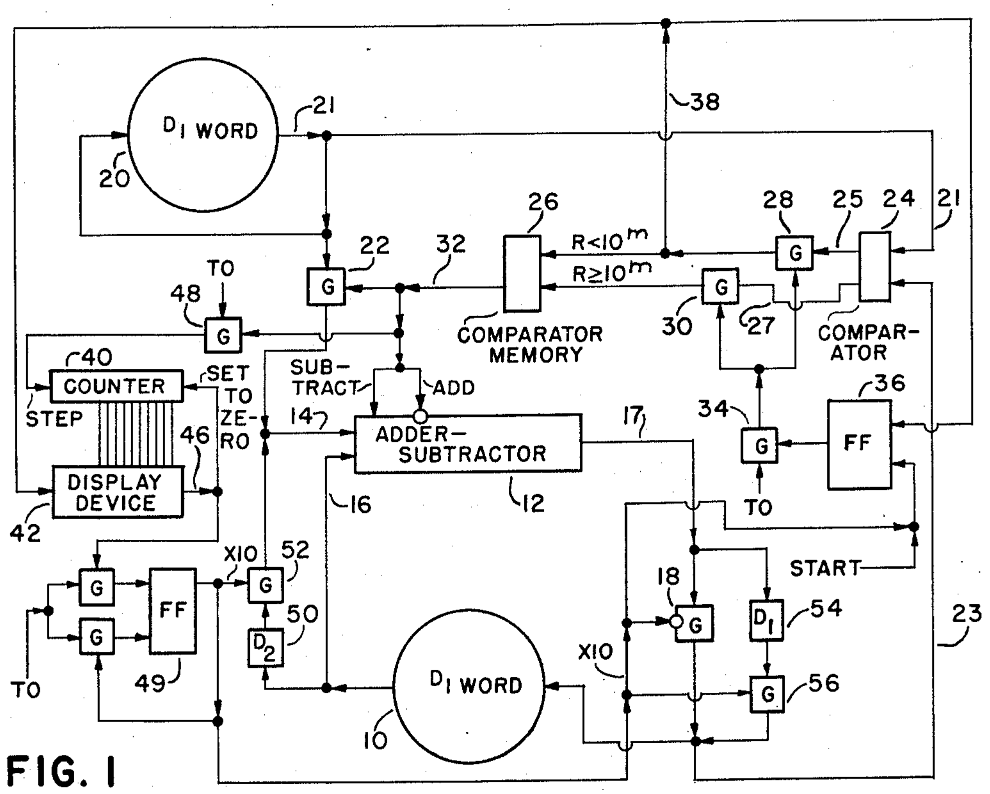

FIG. 1

| | |
|---|---|
| $R_0$ | = PULSE TRAIN IN 10 [423] |
| $10^m$ | = PULSE TRAIN IN 20 [100] |
| $R_1$ | = $R_0 - 10^m$ |
| $R_2$ | = $R_1 - 10^m$ |
| $R_3$ | = $R_2 - 10^m$ |
| $R_4$ | = $R_3 - 10^m$ |
| $R_5$ | = $R_4 \times 10$ |
| $R_6$ | = $R_5 - 10^m$ |
| $R_7$ | = $R_6 - 10^m$ |
| $R_8$ | = $R_7 \times 10$ |
| $R_9$ | = $R_8 - 10^m$ |
| $R_{10}$ | = $R_9 - 10^m$ |
| $R_{11}$ | = $R_{10} - 10^m$ |

| COMPARISON | $2^9 2^8 2^7 2^6 2^5 2^4 2^3 2^2 2^1 2^0$ | COUNTER 40 |
|---|---|---|
| $R \geq 10^m$ | 0 1 1 0 1 0 0 1 1 1 / 0 0 0 1 1 0 0 1 0 0 | 0 |
| $R \geq 10^m$ | 0 1 0 1 0 0 0 0 1 1 / 0 0 0 1 1 0 0 1 0 0 | 1 |
| $R \geq 10^m$ | 0 0 1 1 0 1 1 1 1 1 / 0 0 0 1 1 0 0 1 0 0 | 2 |
| $R \geq 10^m$ | 0 0 0 1 1 1 1 0 1 1 / 0 0 0 1 1 0 0 1 0 0 | 3 |
| $R < 10^m$ | 0 0 0 0 0 1 0 1 1 1 / 0 0 0 1 1 0 0 1 0 0 | 4 DISPLAYED |
| $R \geq 10^m$ | 0 0 1 1 1 0 0 1 1 0 / 0 0 0 1 1 0 0 1 0 0 | 0 |
| $R \geq 10^m$ | 0 0 1 0 0 0 0 0 1 0 / 0 0 0 1 1 0 0 1 0 0 | 1 |
| $R < 10^m$ | 0 0 0 0 0 1 1 1 1 0 / 0 0 0 1 1 0 0 1 0 0 | 2 DISPLAYED |
| $R \geq 10^m$ | 0 1 0 0 1 0 1 1 0 0 / 0 0 0 1 1 0 0 1 0 0 | 0 |
| $R \geq 10^m$ | 0 0 1 1 0 0 1 0 0 0 / 0 0 0 1 1 0 0 1 0 0 | 1 |
| $R \geq 10^m$ | 0 0 0 1 1 0 0 1 0 0 / 0 0 0 1 1 0 0 1 0 0 | 2 |
| | 0 0 0 0 0 0 0 0 0 0 | 3 DISPLAYED |

FIG. 2

INVENTOR
HOWARD M. FLEMING JR.
BY E. Jerry Light
ATTORNEY 2,928,600
Patented Mar. 15, 1960

2,928,600

BINARY TO DECIMAL RADIX CONVERSION APPARATUS

Howard M. Fleming, Jr., Basking Ridge, N.J., assignor to Monroe Calculating Machine Company, Orange, N.J., a corporation of Delaware Application February 4, 1957, Serial No. 637,906

17 Claims. (Cl. 235—155)

This invention relates to readout apparatus and in particular to apparatus for displaying in the decimal notation numerical information available in serial binary notation.

Data handling has been greatly facilitated and speeded up by utilization of electronic techniques. Data handling for scientific and business purposes is usually on a digital basis. Electronic techniques in the performance of calculations on digital data have been most efficiently applied by representing and handling the data in the binary notation. However, the results of calculations in the binary notation for utility and convenience are converted to the decimal notation. The instant invention is concerned with apparatus for performing such conversion.

Objects of the invention are:

To provide apparatus for converting a quantity represented by a serial train of pulses in the binary notation to its decimal equivalent.

To provide apparatus for converting a quantity represented by a serial train of pulses in the binary notation to its decimal equivalent which utilizes a minimum of equipment.

To provide apparatus for converting a quantity represented by a serial train of pulses in the binary notation to its decimal equivalent which is simple in operation and at least as fast in operation as the equipment associated therewith for displaying the decimal equivalent.

These and other objects of the invention and a fuller understanding of the invention may be had by referring to the following description and claims, taken in conjunction with the accompanying drawings in which: Fig. 1 shows the invention in logical notation and form; and Figure 2 shows diagrammatically an example of the operation of the circuit of Figure 1.

The numerical item in serial binary notation to be displayed is stored in a memory or delay unit 10 which may be a track of a magnetic memory drum or a shift register to provide at its output the pulse train received at its input delayed for the time allotted an item of data or word, as is well known in the art. The output of the memory unit 10 is connected to the augend-minuend input 16 of binary adder-subtractor circuit 12. Adder-subtractor circuit 12 performs either addition or subtraction, normally performing addition but performing subtraction in response to a control signal 32, and may be of the type described on pages 283–285 of "High Speed Computing Devices," by the Staff of Engineering Research Associates, published by McGraw Hill Book Company, 1950. The sum-difference output 17 is connected via inhibitory gate 18 to the input of the memory unit 10. Gate 18, as well as the other gates to be mentioned hereinafter, may be any of the known multigrid vacuum tube or diode gate circuits.

Memory unit 20, which may be a duplicate of memory unit 10, stores in the binary notation an item or word equal to an integer ($m$) power of ten. The output 21 of memory unit 20 is fed back to the input thereof besides being directed to permissive gate 22 and to one input of comparator 24.

Comparator 24 may take the form of a flip-flop circuit as is well known in the art and is used to perform a comparison between the contents of memory unit 10 and memory unit 20, between the item to be converted or its remainder, as will be explained, and $10^m$. Accordingly, the input to memory unit 10 is additionally directed to the input 23 of comparator 24. Line 25 from comparator 24 is signal indicating whenever the comparison indicates the input on 21 from memory unit 20 to be greater in value than the input on 23 associated with memory unit 10 while line 27 from comparator 24 is signal indicating whenever the comparison indicates that the input on 23 associated with memory unit 10 is equal to or greater than the input on 21 from memory unit 20. At the end of the time allotted for an item of information a source of timing signals generates a $T_0$ pulse. The conditions of lines 25 and 27 are sensed at the end of the word time by the application of a $T_0$ pulse to permissive gates 28 and 30, respectively, via permissive gate 34. Gate 34 is controlled by flip-flop 36 which is set to permit operation of gate 34 by a start signal. The result of the comparison at the end thereof is thus applied to comparator memory 26 which may also be a flip-flop circuit.

The output 32 of comparator memory 26 which indicates that the value of the item of information in memory unit 10 (R) is equal to or greater than $10^m$, the item stored in memory unit 20, permits gate 22 to pass the output of memory unit 20 to the addend-subtrahend input 14 of adder-subtractor circuit 12. Output 32, in addition, is applied to control adder-subtractor circuit 12 to perform subtraction. Further, the output 32 is applied to condition gate 48 to pass the next following $T_0$ pulse to step counter 40. Counter 40 is initially at a zero state and is stepped one count for each comparison resulting in a determination that $R \geqq 10^m$. Counter 40 may be a decade counter having 10 outputs, one for each decimal count, and is resettable to zero. Connected to the outputs of the counter is a display device 42, such as a solenoid operated typewriter, where the 10 outputs of the counter are conditionally connected, respectively, to the actuating mechanism for displaying each of the decimal digits 0–9.

Whenever the $T_0$ pulse is passed by gate 28 indicating that $R < 10^m$, this pulse is applied via line 38 to permit operation of the display device 42 which completes the circuit for operation of the actuating mechanism conditioned by the signal producing output of counter 40. Upon completion of its display operation the display device transmits a signal which is applied via line 46 to reset the counter 40 to its zero setting. The signal on line 38 is also applied to reset flip-flop 36 to remove the permission condition from gate 34 until display device 42 has completed its operation. The comparator is accordingly not sensed during the time that display device 42 is operating.

Associated with memory unit 10 and adder-subtractor circuit 12 is circuitry whereby a multiplication by ten is carried out in response to the display completion signal on line 46 lengthened for the time for transmission of an item of information or word ($\times 10$ signal) by pulse stretcher 49. Pulse stretcher 49 is shown as a flip-flop which is set by a $T_0$ pulse gated by the signal on line 46, which must last long enough to ensure coincidence with a $T_0$ pulse, and restored by the next following $T_0$ pulse. The $\times 10$ signal is utilized also to set flip-flop 36 to permit sensing of the comparator setting at the end of the next word time.

The circuitry for performing the multiplication by ten includes a two-pulse-time delay device 50 and permissive gate 52 connected in series between the output of memory unit 10 and addend-subtrahend input 14 of adder-subtractor 12 and one-pulse-time delay device 54 and permissive gate 56 connected in series between output 17 of adder-subtractor 12 and the input to memory unit 10. Delay devices 50 and 54 may be shift registers of two and one stages, respectively, or lumped parameter artificial transmission lines. The multiply by ten (×10) signal is applied to inhibit gate 18 and thereby the normal path from the output line 17 to memory unit 10 and is applied to render operable gates 52 and 56. The absence of a signal on line 32 causes adder-subtractor circuit 12 to operate for addition. Accordingly, the output from memory unit 10 is passed directly to the augend input 16 and via delay device 50 to the addend input 14. There is thus applied to an adder circuit the R pulse train and a pulse train equal to four times R. These are added together to produce a pulse train equal to five times R. From the output line 17 this pulse train passes through delay device 54 to double this pulse train completing the multiplication by ten.

The power of ten which is stored in memory unit 20 should be equal to the capacity of the memory unit 10 as regards the power of ten of its decimal equivalent. For example, if the capacity of memory unit 10 is a binary number or word of twenty bits, the decimal equivalent of which is $2^{21}$ or almost 2,100,000, then the power of ten stored in memory unit 20 should be $10^6$ or 1,000,000. Of course, the power of ten in memory unit 20 may be a lower power of ten if the numbers placed in memory unit 10 are known to be below the capacity of this memory unit. If such numbers are known to be below 1,000 in decimal value, then the power of ten stored in memory 20 need not exceed $10^2$ or 100.

The steps of operation of the invention to display the number 423 stored in the binary notation in memory unit 10 and $10^2$ or 100 stored in the binary notation in memory unit 20 is shown in Figure 2.

Display device 42, which has been exemplarily disclosed as an electric typewriter, will type the numeral found as the highest decimal order and shift for typing the numeral found to be the next highest decimal order when the next signal is received via line 38. It may be desired to inhibit typing of non-significant zeros; this is a well-known expedient in the art.

It is to be understood that as part of an overall data handling equipment the apparatus herein described will be conditioned for operation in response to specific control stimuli and that means to selectively insert items of information in storage unit 10 are provided.

The invention may be more generally considered as relating to division wherein the dividend and divisor are in binary notation and the quotient is obtained in the decimal notation. The invention serves to convert a quantity in binary notation to its decimal equivalent in the specific situation where the quantity to be converted is treated as the dividend and an integer power of ten is the divisor. A description of the invention for the specific purpose of converting a quantity to its decimal notation has been given.

Although the invention has been described with a certain degree of particularity, it is understood that the present disclosure has been made only by way of example and that numerous changes in the details of construction and the combination and arrangements of parts may be resorted to without departing from the spirit and scope of the invention as hereinafter claimed.

What is claimed is:

1. Apparatus for converting a quantity represented by a serial train of pulses in the binary notation to its decimal equivalent, comprising a subtractor circuit having a minuend input, a subtrahend input and a difference output, means for applying said quantity pulse train to said minuend input, a delay device for delaying transmission of pulses for the time of transmission of a pulse train, the input of said delay device being connected to said difference output and the output of said delay device being connected to said minuend input, means for supplying a pulse train representative of an integral power of ten in the binary notation, means for connecting said power of ten pulse train supplying means to said subtrahend input, means for comparing binary pulse trains having a first and a second input and generating a first output signal when the pulse train applied to said first input is representative of a magnitude equal to or greater than the magnitude represented by the pulse train on said second input and generating a second output signal when the pulse train on said first input is representative of a magnitude less than the magnitude represented by the pulse train on said second input, said difference output being connected to said first input and said power of ten pulse train supplying means being connected to said second input, a counter, means for multiplying a binary pulse train by ten, and means controlled by said comparing means first output signal for effectuating said connecting means and for effecting the application of a stepping pulse to said counter and controlled by said comparing means second output signal for effecting application of the pulse train from said delay device to said multiplying means, for effecting a display of the count attained by said counter and for clearing said counter.

2. Apparatus for converting a quantity represented by a serial train of pulses in the binary notation to its decimal equivalent, comprising a storage device for storing said quantity pulse train having an input and an output, means for supplying a pulse train representative of an integer power of ten in the binary notation, means for comparing the pulse train in said storage device with said power of ten pulse train producing an output signal when said storage device pulse train has a value which is equal to or greater than said power of ten, a subtractor circuit having a minuend input, a subtrahend input and a difference output, the difference output being connected to the input of said storage device, a counter, and means responsive to said comparing means output signal for effectuating the connection of the output of said storage device to said minuend input, for connecting said power of ten pulse train supplying means to said subtrahend input and for effecting the application of a stepping pulse to said counter.

3. The apparatus as claimed in claim 2 wherein said comparing means produces a second output signal when said storage device pulse train has a value which is less than said power of ten, further including a display device for displaying the count attained by said counter rendered operative in response to said comparing means second output signal.

4. The apparatus as claimed in claim 3 wherein said counter is reset to zero after the display of the count attained by said counter.

5. The apparatus as claimed in claim 4 further including means for multiplying by ten the binary pulse train in said storage device rendered operative in response to said comparing means second output signal.

6. The apparatus as claimed in claim 5 including means responsive to said comparing means second output signal for rendering ineffective said comparing means output signals until after the display of the count attained by said counter.

7. Apparatus for converting a quantity represented by a serial train of pulses in the binary notation to its decimal equivalent, comprising a storage device for storing said quantity pulse train having an input and an output, means for supplying a pulse train representative of an integer power of ten in the binary notation, means for comparing the pulse train in said storage device with said power of ten pulse train producing an output signal when said storage device pulse train has a value which is equal to or greater than said power of ten, an adder-subtractor circuit having an augend-minuend input, an addend-subtrahend input and a sum-difference output, the input of said storage device being connected to the output of said adder-subtractor circuit and the output of said storage device being connected to the augend-minuend input of said adder subtractor circuit, a counter and means responsive to said comparing means output signal for causing said adder-subtractor circuit to operate for subtracting, for connecting said power of ten pulse train supplying means to said addend-subtrahend input and for effecting the application of a stepping pulse to said counter.

8. The apparatus as claimed in claim 7 wherein said comparing means produces a second output signal when said storage device pulse train has a value which is less than said power of ten, further including a display device for displaying the count attained by said counter rendered operative in response to said comparing means second output signal.

9. The apparatus as claimed in claim 8 wherein said counter is reset to zero after the display of the count attained by said counter.

10. The apparatus as claimed in claim 9 further including means associated with said adder-subtractor circuit and said storage device for effecting a multiplication by ten of the pulse train in said storage device rendered operative in response to said comparing means second output signal.

11. The apparatus as claimed in claim 10 wherein said means for effecting a multiplication by ten comprises means for causing said adder-subtractor circuit to operate for adding, a two-pulse-time delay device connected between the output of said storage device and said addend-subtrahend input and a one-pulse-time delay device connected between the output of said adder-subtractor circuit and the input of said storage device.

12. The apparatus as claimed in claim 11 including means responsive to said comparing means second output signal for rendering ineffective said comparing means output signals until after the display of the count attained by said counter.

13. Apparatus for finding in decimal notation the number of times a first quantity represented by a first serial train of pulses in binary notation is contained in a second quantity represented by a second serial train of pulses in binary notation comprising a first storage device for storing said first pulse train having an input and an output, a second storage device for storing said second pulse train having an output, means for comparing the pulse trains in said first and second storage devices and producing an output signal when said first storage device pulse train has a value which is equal to or greater than said second storage device pulse train, a subtractor circuit having a minuend input, a subtrahend input and a difference output, the difference output being connected to the input of said first storage device, a counter, and means responsive to said comparing means output signal for effectuating the connection of the output of said first storage device to said minuend input, for effectuating the connection of the output of said second storage device to said subtrahend input and for effecting the application of a stepping pulse to said counter.

14. The apparatus as claimed in claim 13 wherein said comparing means produces a second output signal when said first storage device pulse train has a value which is less than said second storage device pulse train, further including a display device for displaying the count attained by said counter rendered operative in response to said comparing means second output signal.

15. The apparatus as claimed in claim 14 wherein said counter is reset to zero after the display of the count attained by said counter.

16. The apparatus as claimed in claim 15 further including means for multiplying by ten the binary pulse train in said first storage device rendered operative in response to said comparing means second output signal.

17. The apparatus as claimed in claim 16 including means responsive to said comparing means second output signal for rendering ineffective said comparing means output signals until after the display of the count attained by said counter.

References Cited in the file of this patent

UNITED STATES PATENTS

| | | |
|---|---|---|
| 2,860,831 | Hobbs | Nov. 18, 1958 |
| 2,864,557 | Hobbs | Dec. 16, 1958 |

OTHER REFERENCES

Bird: Computing Machines, Input and Output Electronic Engineering, October 1953, pp. 407 to 409 (4 pages).